United States Patent [19]
Rho

[11] Patent Number: 5,220,446
[45] Date of Patent: Jun. 15, 1993

[54] LIQUID CRYSTAL DISPLAY ELEMENTS WITH SPACERS ATTACHED TO INSULATION AND ORIENTATION LAYERS AND METHOD FOR MANUFACTURING THEM

[75] Inventor: Bong G. Rho, Kyungsangbook, Rep. of Korea

[73] Assignee: Goldstar Co., Ltd., Seoul, Rep. of Korea

[21] Appl. No.: 800,024

[22] Filed: Nov. 27, 1991

[30] Foreign Application Priority Data

Nov. 29, 1990 [KR] Rep. of Korea ............... 19430/1990

[51] Int. Cl.⁵ ................. G02F 1/1333; G02F 1/1339; C09K 19/00
[52] U.S. Cl. ........................ 359/79; 359/81; 428/1
[58] Field of Search .............. 359/81, 79; 428/1

[56] References Cited

U.S. PATENT DOCUMENTS

| | | | |
|---|---|---|---|
| 4,362,771 | 12/1982 | Umeda et al. | 359/79 |
| 4,470,668 | 9/1984 | Inoue et al. | 359/81 |
| 4,966,442 | 10/1990 | Ono et al. | 359/81 |
| 5,054,890 | 10/1991 | Hanyu et al. | 359/81 |

FOREIGN PATENT DOCUMENTS

| | | | |
|---|---|---|---|
| 57-191618 | 11/1982 | Japan | 359/81 |
| 60-200228 | 10/1985 | Japan | 359/81 |
| 3-068924 | 3/1991 | Japan | 359/81 |
| 3-107921 | 5/1991 | Japan | 359/79 |
| 3-208018 | 9/1991 | Japan | 359/79 |
| 3-229220 | 10/1991 | Japan | 359/81 |

*Primary Examiner*—William L. Sikes
*Assistant Examiner*—Anita Pellman Gross

[57] ABSTRACT

A method of dispersing spacers and liquid crystal display elements made by the method, capable of lengthening the life of twisted nematic (TN) and super twisted nematic (STN) which require high reliability. Spacers are dispersed on an upper glass substrate, by using air or volatile liquid. Thereafter, an insulation solution is printed on glass substrates having patterned transparent conductive films. Otherwise, spacers are mixed in an insulation solution. Then, the mixture is printed on glass substrates. The obtained liquid crystal element has a construction wherein each spacer is fixed at its opposite sides to oriented layers as well as insulation layers, respectively.

7 Claims, 1 Drawing Sheet

LIQUID CRYSTAL DISPLAY ELEMENTS WITH SPACERS ATTACHED TO INSULATION AND ORIENTATION LAYERS AND METHOD FOR MANUFACTURING THEM

BACKGROUND OF THE INVENTION

1. Field of the Invention

The present invention relates to a liquid crystal display element and a method for manufacturing the same, and more particularly to a method of dispersing spacers and liquid crystal display elements made by the method, capable of lengthening the life of twisted nematic (TN) and super twisted nematic (STN) which require high reliability.

2. Description of the Prior Art

Referring to FIG. 1 there is shown an example of general liquid crystal display elements. As shown in the drawing, the liquid crystal display element comprises upper and lower glass substrates 1 and 1', each coated with an ITO (Indium Tin Oxide) film which is a transparent conductive film. On upper and lower glass substrates 1 and 1', photosensitive resin layers are coated. The coating of photosensitive conductive resin layers is carried out under the condition that upper and lower glass substrates 1 and 1' have been cleaned and then dried to remove moisture therefrom. As the photosensitive resin layers are selectively radiated with light, transparent conductive films coated on upper and lower glass substrates 1 and 1' are etched to form an upper common electrode 3 and a lower pixel electrode 3' having desired patterns, respectively. That is, upper and lower transparent conductive films are patterned to have a 90° crossed matrix shape.

Thereafter, an insulating solution which contains a main solvent of $SiO_2$ is applied to glass substrates 1 and 1' having patterned transparent conductive films by using a coating method. The insulation solution is then dried to volatilize its solvent, thereby forming insulation layers 4 and 4', each having a thickness of about 500 Å, on the glass substrates 1 and 1'.

On insulation layers 4 and 4', polyimide layers are coated to form oriented layers 5 and 5', by using a roll coating method. Between oriented layers 5 and 5', spacers 7 are interposed. The interposition of spacers 7 can be accomplished by coating polyimide layers in which spacers are mixed, or dispersing spacers after coating polyimide layers. In the latter case, the coated poyimide layers are subjected to scratching and rubbing.

Subsequently, a seal 8 is formed by a screen printing. Then, upper and lower glass substrates 1 and 1' adhere to each other by using a pressure setting, so as to form a plurality of liquid crystal cells between oriented layers 5 and 5'. The obtained structure is then cut by being subjected to a mechanical impact, for example, by using a silicon carbide or diamond cutter so that it is divided into respective liquid crystal cells.

In order to inject a liquid crystal into respective liquid crystal cells, liquid crystal cells together with a container containing liquid crystal therein are then disposed in a vacuum chamber. The container is subjected to ultrasonic wave to extract moisture and air bubbles from liquid crystal, under the condition of letting air out of the vacuum chamber. After the chamber is at a vacuum state, nitrogen gas is injected into the chamber under the condition that the liquid crystal is in contact with an inlet of each liquid crystal cell. As the nitrogen gas is injected into the chamber, the liquid crystal enters the liquid crystal cells, by virtue of the difference between the pressure in each liquid crystal cell and the pressure in the chamber and a capillary phenomenon. After the completion of injecting liquid crystal into cells, the inlet of each cell is sealed by a photosetting resin, to prevent the liquid crystal 6 in the cell from contacting air and moisture contained in the air.

Finger marks and organic matters on liquid crystal cells are then removed. Subsequently, polarizing plates 2 and 2' are adhered to outer surfaces of upper and lower glass substrates 1 and 1', respectively. In order to obtain a good adhesion, liquid crystal cells are cleaned by a freon gas for about 20 seconds, before the adhesion.

Typically, the above-mentioned dispersion of spacers 7 in manufacturing liquid cells is accomplished by using either of the following two methods.

One is method which comprises the steps of mixing spacers in an oriented layer producing solution at a proper mixing rate, coating the produced mixture on insulation layers to form oriented layers containing spacers interposed therebetween, and then setting the formed oriented layers.

The other is a method which comprises the steps of coating the oriented layer producing solution alone on insulation layers, rubbing the produced oriented layers, and dispersing spacers of being mixed with air or volatile liquid, between oriented layers, before the adhesion of upper and lower glass substrates.

The position of spacers varies depending on the used dispersing method. For example, the position of the spacer 7 shown in FIG. 1 corresponds to the first method, while the position of the spacer 7' the second method.

The first method is mainly used in the case where the oriented layers are of an organic high-molecular material containing polyimide as its main ingredient and the spacers are of a mineral material containing lass fiber or aluminum oxide ($Al_2O_3$). In case of dispersing spacers under the condition of being mixed in the oriented layer producing solution, by using the first method, pin holes may occur in the formed oriented layers, due to the surface tension generated between each spacer and the solution and the difference between the cohesion of each spacer and the cohesion of the solution. Furthermore, the formed oriented layers may have irregular thickness due to the same causes. Upon rubbing, the spacers may be displaced from their original positions, thereby causing the oriented layers to be damaged. In case when the spacers are broken, there may be a disadvantage that the gap in liquid crystal cell can not be uniformly maintained.

In the second method wherein spacers are dispersed after rubbing of oriented layers, surfaces of upper and lower glass substrates are subjected to a vacuum cleaning, in order to remove dirts or contaminants therefrom, before upper and lower glass substrates adhered to each other. Since the vacuum cleaning is carried out after rubbing of oriented layers, foreign matters may enter the gap, thereby causing the gap to be poor.

SUMMARY OF THE INVENTION

Therefore, an object of the present invention is to provide a method of dispersing spacers capable of reducing the damage of oriented layers caused by the displacement of spacers and improving the uniformity, as well as an improved liquid crystal cell construction made by the method.

In one aspect, the present invention provides a liquid crystal display element comprising upper and lower glass substrates defining a liquid crystal cell containing liquid crystal therebetween, a pair of polarizing plates attached to respective outer surfaces of the glass substrates and adapted to control the direction of light, a pair of conductive layers coated on respective inner surfaces of the glass substrates and adapted to function as a common electrode and a pixel electrode, respectively, a pair of insulation layers formed on respective surfaces of the conductive layers to provide an electrical insulation, a pair of oriented layers formed on respective surfaces of the insulation layers and adapted to make the liquid crystal have a predetermined orientation upon being subjected to a control voltage applied via the conductive layers and the glass substrates, and spacers adapted to maintain uniformly the gap defined between the common electrode and the pixel electrode, each of the spacers being fixed at its opposite sides to oriented layers as well as insulation layers, respectively.

In another aspect, the present invention also provides a method of manufacturing a liquid crystal element having spaced upper and lower glass substrates, comprising the steps of: forming a common electrode and a pixel electrode on respective inner surfaces of the glass substrates; dispersing spacers on the common electrode, so as to maintain uniformly the gap defined between the common electrode and the pixel electrode; coating insulation layers on the common electrode and the pixel electrode and then setting them; and coating oriented layers on the insulation layers and then setting them.

In a further aspect, the present invention also provides a method of manufacturing a liquid crystal element having spaced upper and lower glass substrates, comprising the steps of: forming a common electrode and a pixel electrode on respective inner surfaces of the glass substrates; mixing spacers in an insulation solution, the spacers being adapted to maintain uniformly the gap defined between the common electrode and the pixel electrode, applying the mixture on the common electrode and the pixel electrode, and then setting it to form insulation layers; and coating oriented layers on the insulation layers and then setting them.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
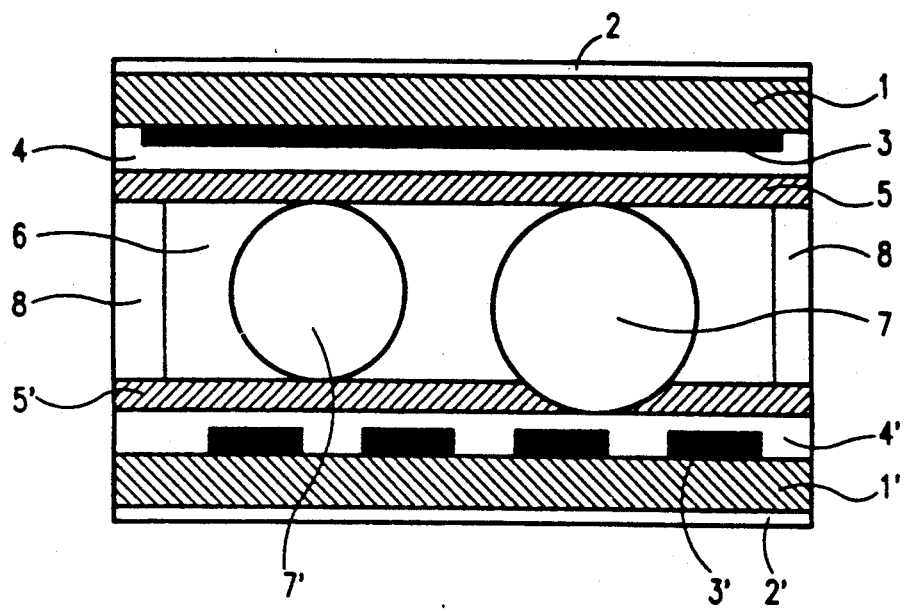
FIG. 1 a sectional view of the construction of a conventional liquid crystal display element.
Figure 2:
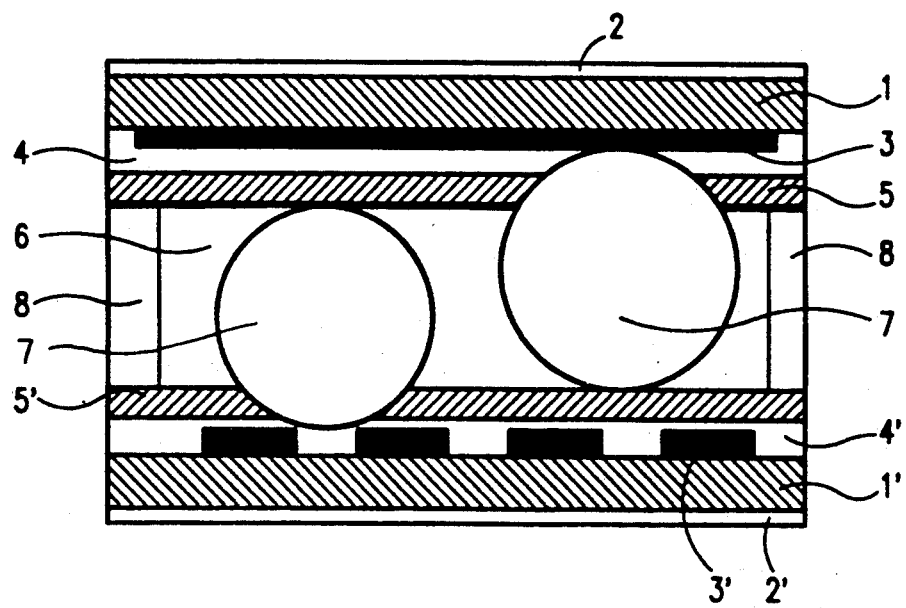
FIG. 2 is a sectional view of the construction of a liquid crystal display element in accordance with an embodiment of the present invention.

Referring to FIG. 2, there is shown the construction of a liquid crystal display element in accordance with the present invention. In the drawing, the same reference numerals as in FIG. 1 illustrating the prior art designate layers having the same properties, respectively.

As shown in FIG. 2, the liquid crystal display element according to the present invention comprises upper and lower glass substrates 1 and 1', each coated with an ITO film which is a transparent conductive film. On upper and lower glass substrates 1 and 1', photosensitive resin layers are coated. The coating of photosensitive conductive resin layers is carried out under the condition that upper and lower glass substrates 1 and 1' have been cleaned and then dried to remove moisture therefrom. As the photosensitive resin layers are selectively radiated with light, transparent conductive films coated on upper and lower glass substrates 1 and 1' are etched to form an upper common electrode 3 and a lower pixel electrode 3' having desired patterns, respectively.

Spacers 7 are dispersed on the upper glass substrate 1, by using air or volatile liquid.

Thereafter, a solution which contains a main solvent of the following general formula (I) and a solute of the following general formula (II) is printed on glass substrates 1 and 1' having patterned transparent conductive films by using a roll printer.

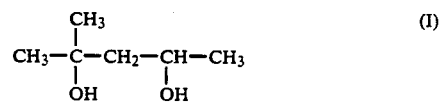

The insulation solution is then set by being subjected to both ultraviolet ray and heat, thereby forming insulation layers 4 and 4' on upper and lower glass substrates 1 and 1', respectively.

On insulation layers 4 and 4', polyimide layers are printed to form oriented layers 5 and 5', by using a roll printer. Subsequently, a seal 8 is deposited by a screen printing. Then, oriented layers 5 and 5' are subjected to a rubbing. Upper and lower glass substrates 1 and 1' then adhere to each other, so as to be sealed. A liquid crystal 6 is then injected into the sealed structure.

The dispersion of spacers may be carried out, by using another method of the present invention. That is, spacers 7 are mixed in an insulation solution which is prepared to form insulation layers 4 and 4' and contains a major solvent of the above-mentioned general formula (I) and a solute of the above-mentioned general formula (II). Then, the mixture is printed on glass substrates 1 and 1' by using a roll printer. The mixture is then subjected to both ultraviolet ray and heat, thereby setting the insulation solution to form insulation layers 4 and 4' on upper and lower glass substrates 1 and 1', respectively, as well as fixing the spacers 7 to insulation layers 4 and 4'.

By dispersing the spacers 7 in accordance with the first embodiment or the second embodiment of the present invention, the obtained liquid crystal element has a construction wherein each spacer 7 is fixed at its opposite sides to oriented layers 5 and 5' and insulation layers 4 and 4', respectively.

As apparent from the above description, the present invention provides a method of dispersing spacers wherein spacers are fixed at opposite sides to oriented layers as well as insulation layers. Accordingly, it is possible to prevent the spacers from being displaced upon rubbing and being broken, thereby reducing the damage of oriented layers. Furthermore, the uniformly of oriented layers is improved, so that the orientation of liquid crystal can be uniform, thereby enabling an image to be clearly reproduced.

Although the preferred embodiments of the invention have been disclosed for illustrative purpose, those skilled in the art will appreciate that various modifications, additions and substitutions are possible, without departing from the scope and spirit of the invention as disclosed in the accompanying claims.

What is claimed is:

1. A liquid crystal display element comprising:
   upper and lower glass substrates for defining a liquid crystal cell containing liquid crystal therebetween;
   a pair of polarizing plates, attached to respective outer surfaces of said glass substrates, for controlling the direction of light;
   a pair of conductive layers, coated on respective inner surfaces of the glass substrates, for being used as a common electrode and a pixel electrode, respectively;
   a pair of insulation layers formed on respective surfaces of said conductive layers to provide an electrical insulation;
   a pair of oriented layers, formed on respective surfaces of said insulation layers, for providing said liquid crystal with a predetermined orientation upon being subjected to a control voltage applied via the conductive layers and the glass substrates;
   spacers for maintaining uniformly the gap defined between said common electrode and said pixel electrode, each of said spacers being fixed at its opposite sides to oriented layers as well as insulation layers, respectively.

2. A method for manufacturing a liquid crystal element having spaced upper and lower glass substrates, comprising the steps of:
   forming a common electrode and a pixel electrode on respective inner surfaces of said glass substrates;
   dispersing spacers on said common electrode, so as to maintain uniformly the gap defined between the common electrode and said pixel electrode;
   coating insulation layers on the common electrode and the pixel electrode and then setting them; and
   coating oriented layers on said insulation layers and then setting them.

3. A method in accordance with claim 2, wherein said step of setting the insulation layers comprises the step of applying both ultraviolet ray and heat to them.

4. A method in accordance with claim 2, wherein said insulation layers are formed of an insulation solution containing a main solvent of the following general formula (I) and a solute of the following general formula (II).

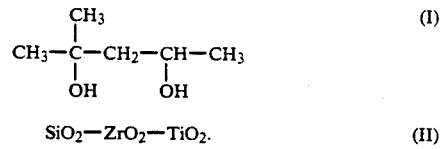

5. A method for manufacturing a liquid crystal element having spaced upper and lower glass substrates, comprising the steps of:
   forming a common electrode and a pixel electrode on respective inner surfaces of said glass substrates;
   mixing spacers in an insulation solution, said spacers being adapted to maintain uniformly the gap defined between said common electrode and said pixel electrode, applying the mixture on the common electrode and the pixel electrode, and then setting it to form insulation layers; and coating oriented layers on said insulation layers and then setting them.

6. A method in accordance with claim 5, wherein said step of setting the insulation layers comprises the step of applying both ultraviolet ray and heat to them.

7. A method in accordance with claim 5, wherein said insulation layers are formed of an insulation solution containing a main solvent of the following general formula (I) and a solute of the following general formula (II).

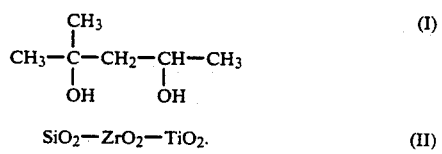

* * * * *